(12) United States Patent
Cavina

(10) Patent No.: US 8,684,162 B2
(45) Date of Patent: Apr. 1, 2014

(54) METHOD FOR WEIGHING CONTAINERS WHICH ARE SUPPLIED ALONG A CONVEYING LINE AND A DEVICE FOR ACTUATING THE METHOD

(75) Inventor: Luigi Cavina, Bologna (IT)

(73) Assignee: IMA Life S.r.l., Ozzano dell'Emilia (Bologna) (IT)

( * ) Notice: Subject to any disclaimer, the term of this patent is extended or adjusted under 35 U.S.C. 154(b) by 297 days.

(21) Appl. No.: 13/318,852

(22) PCT Filed: Apr. 19, 2010

(86) PCT No.: PCT/EP2010/055096
§ 371 (c)(1),
(2), (4) Date: Nov. 4, 2011

(87) PCT Pub. No.: WO2010/127936
PCT Pub. Date: Nov. 11, 2010

(65) Prior Publication Data
US 2012/0043181 A1    Feb. 23, 2012

(30) Foreign Application Priority Data
May 8, 2009   (IT) .............................. BO2009A0285

(51) Int. Cl.
*B65B 43/52*          (2006.01)
(52) U.S. Cl.
USPC ..................... 198/346.1; 198/345.1; 198/617; 177/119; 177/145

(58) Field of Classification Search
USPC ................ 198/345.1, 346.1, 346.2, 617, 959; 177/119, 145, 149
See application file for complete search history.

(56) References Cited
U.S. PATENT DOCUMENTS
2,319,908 A * 5/1943 Walter ............................. 177/57

4,339,028 A * 7/1982 Meacle .......................... 198/427
(Continued)

FOREIGN PATENT DOCUMENTS
EP        0496083 A    7/1992
WO    WO01/68451 A    9/2001

OTHER PUBLICATIONS
International Search Report, for PCT/EP2010/055096, mailed Aug. 2, 2010, 2 sheets.

*Primary Examiner* — Douglas Hess
(74) *Attorney, Agent, or Firm* — William J. Sapone; Ware Fressola; Maguire & Barber LLP

(57) ABSTRACT

The invention relates to a device and a method for weighing containers (2) supplied along a conveying line (L). The device comprises: first weighing means (MP1) arranged on a first side (L1) of a stretch (T) of the conveying line (L) of containers (2) in a proximal position thereto; second weighing means (MP2) arranged at a side of the stretch (T) of the conveying line (L) of containers (2) in a distal position thereto; a supporting member (8) activatable between a first position (P1) in which it is arranged at the stretch (T) of the conveying line (L) for receiving the containers (2), a second position (P2) in which it engages with the first weighing means (MP1), and a third position (P3) in which it engages with the second weighing means (MP2); and first guide means (9) activatable between a guide configuration (C1), in which they are arranged at the stretch (T) in order to guide the containers (2) along the conveying line (L), and a disengaged position (C2). The method comprises steps of: activating the support member (8) in order to bring the containers (2) received from the conveying line (L) into the third position (P3); activating the second weighing means (MP2) order to weigh the containers (2); activating the first guide means (9) in order to reach the guide configuration (C1) in phase relation with the movement of the support member (8).

15 Claims, 14 Drawing Sheets

(56) References Cited

U.S. PATENT DOCUMENTS

| | | | |
|---|---|---|---|
| 5,004,093 A * | 4/1991 | Blezard | 198/430 |
| 5,176,241 A * | 1/1993 | Schaltegger | 198/346.2 |
| 5,193,630 A * | 3/1993 | Cane | 177/50 |
| 5,877,457 A * | 3/1999 | Corniani et al. | 177/116 |
| 6,096,983 A * | 8/2000 | Ozaki et al. | 177/52 |
| 6,627,826 B2 * | 9/2003 | Cavina et al. | 177/145 |
| 6,800,818 B2 * | 10/2004 | Balboni et al. | 177/52 |
| 8,016,538 B2 * | 9/2011 | Monti | 414/222.13 |
| 8,455,773 B2 * | 6/2013 | Trebbi et al. | 177/145 |

* cited by examiner

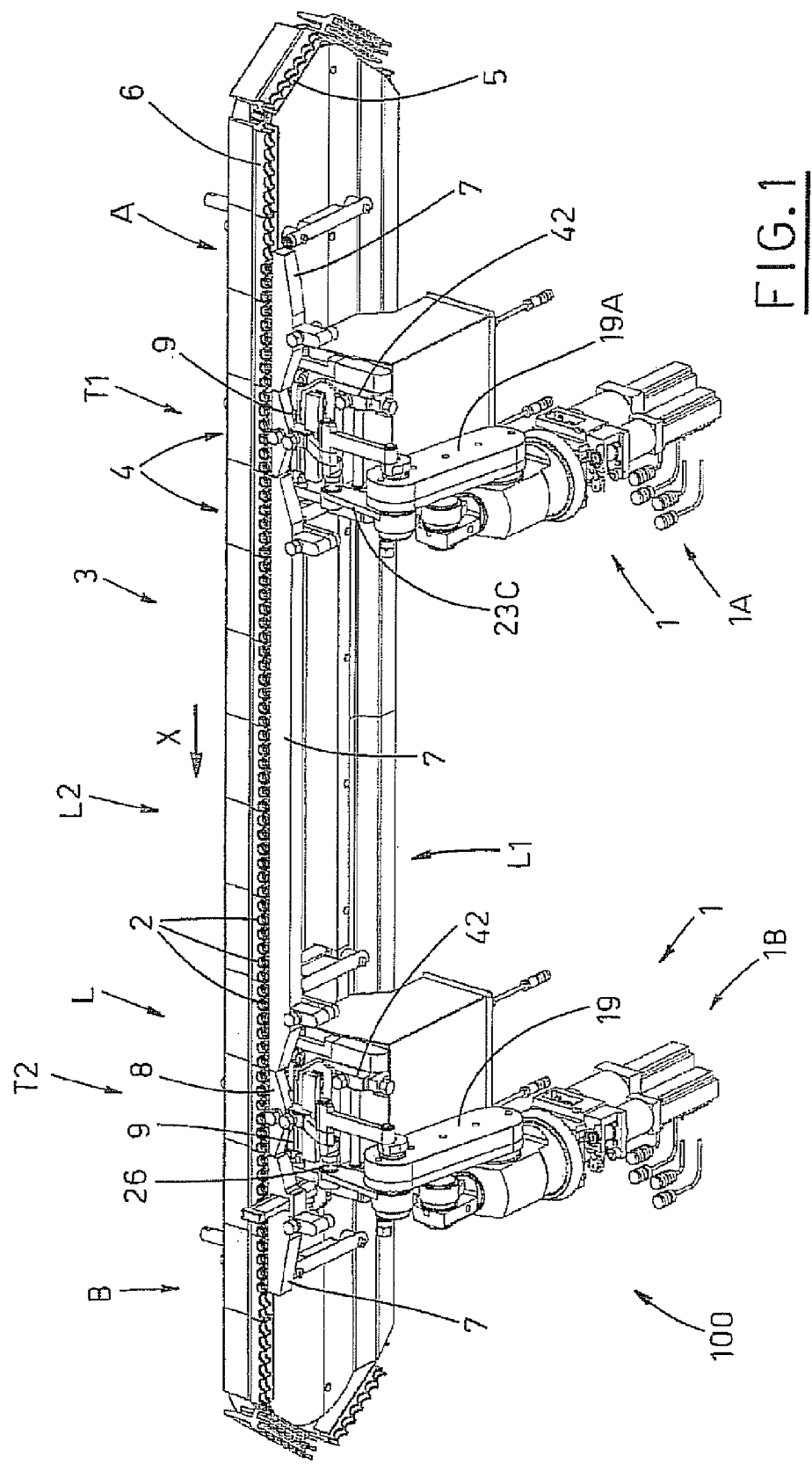

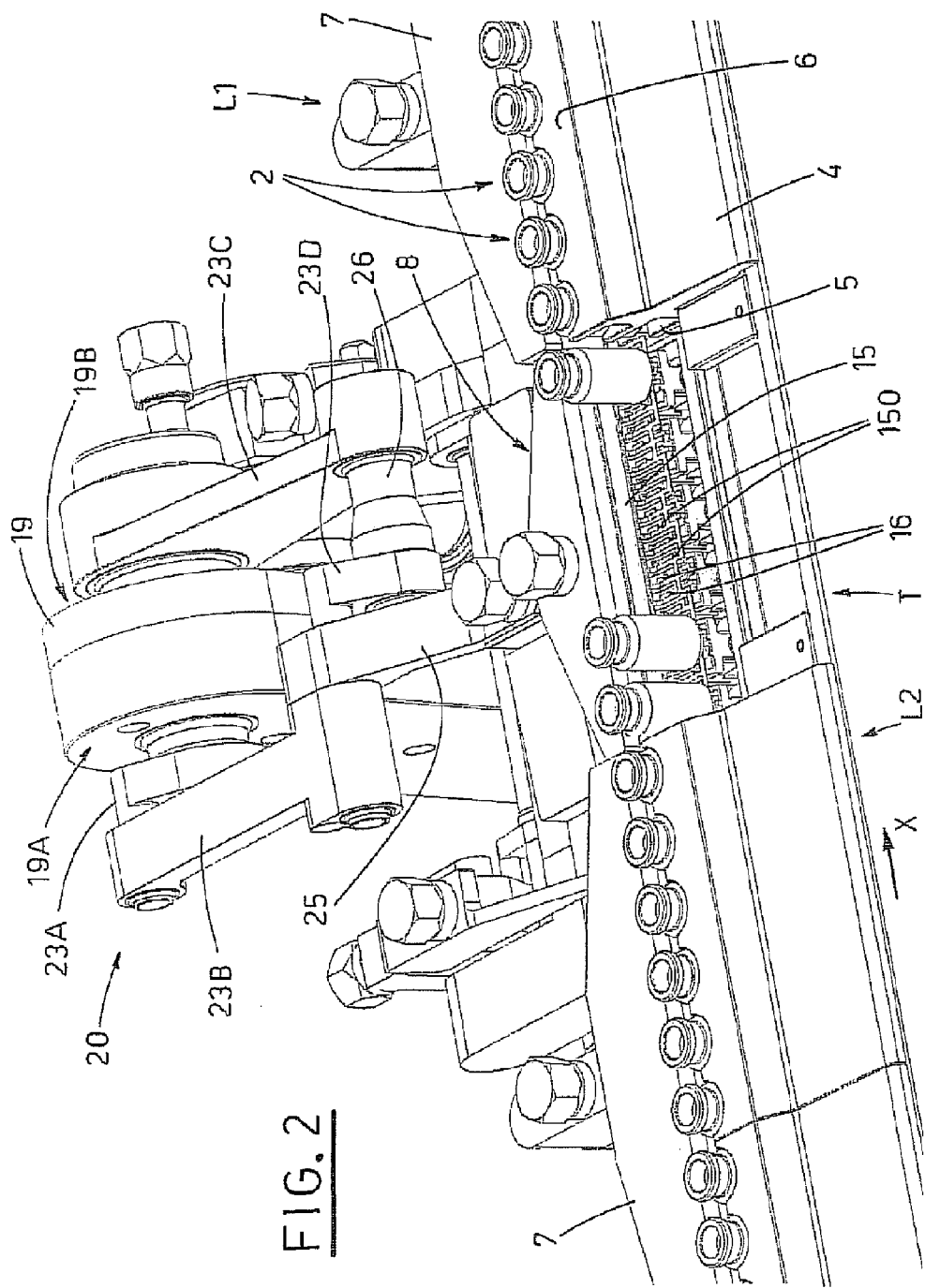

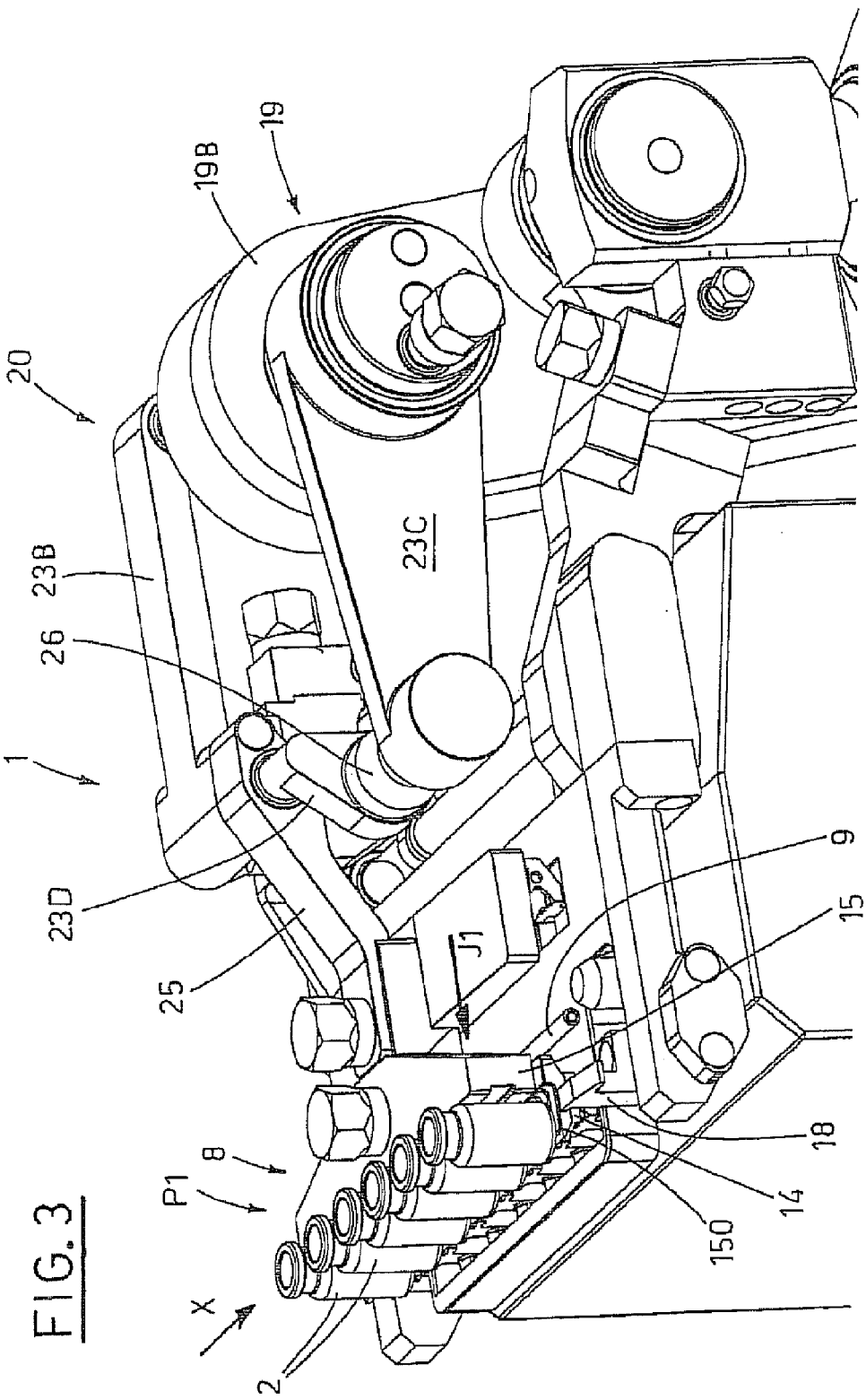

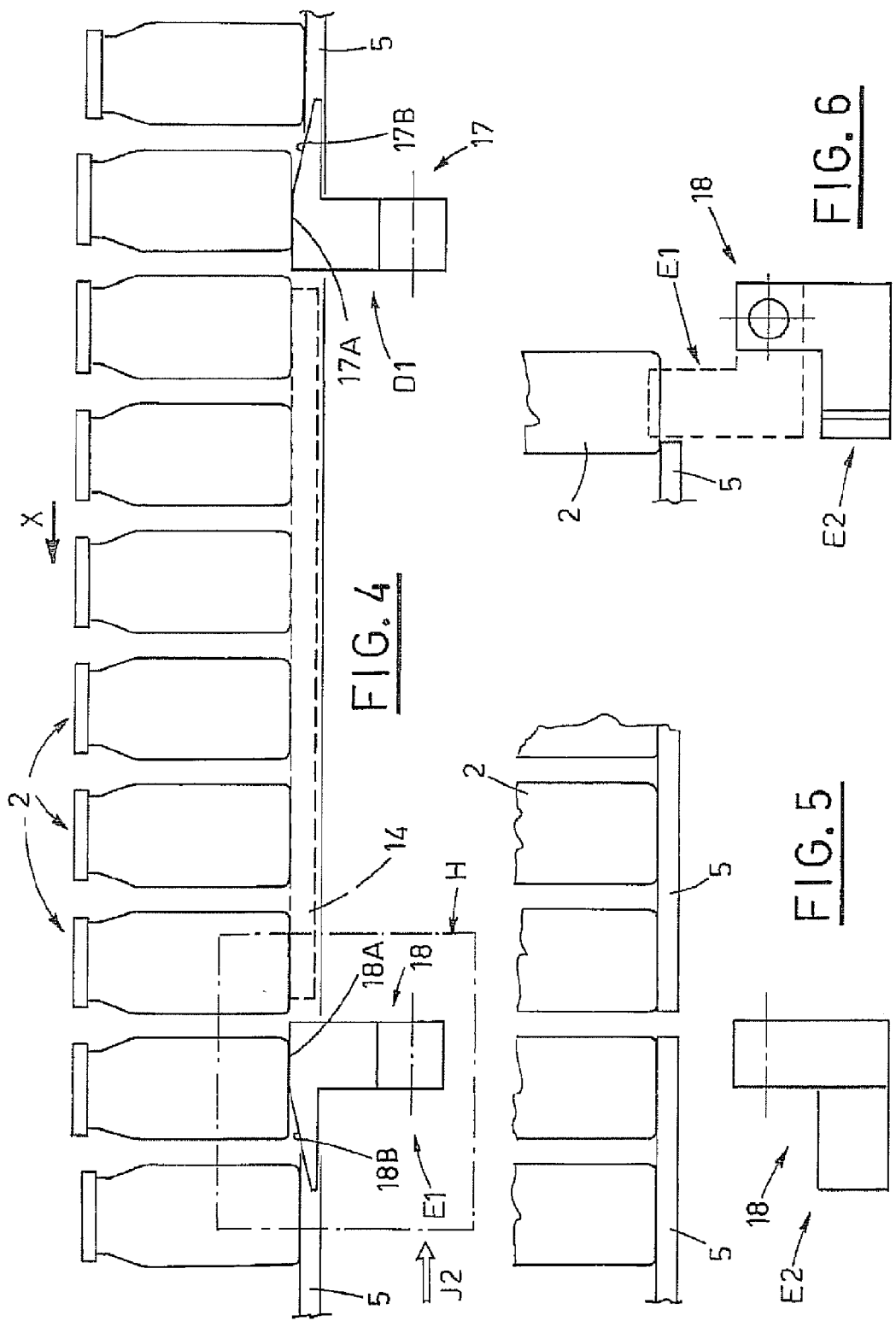

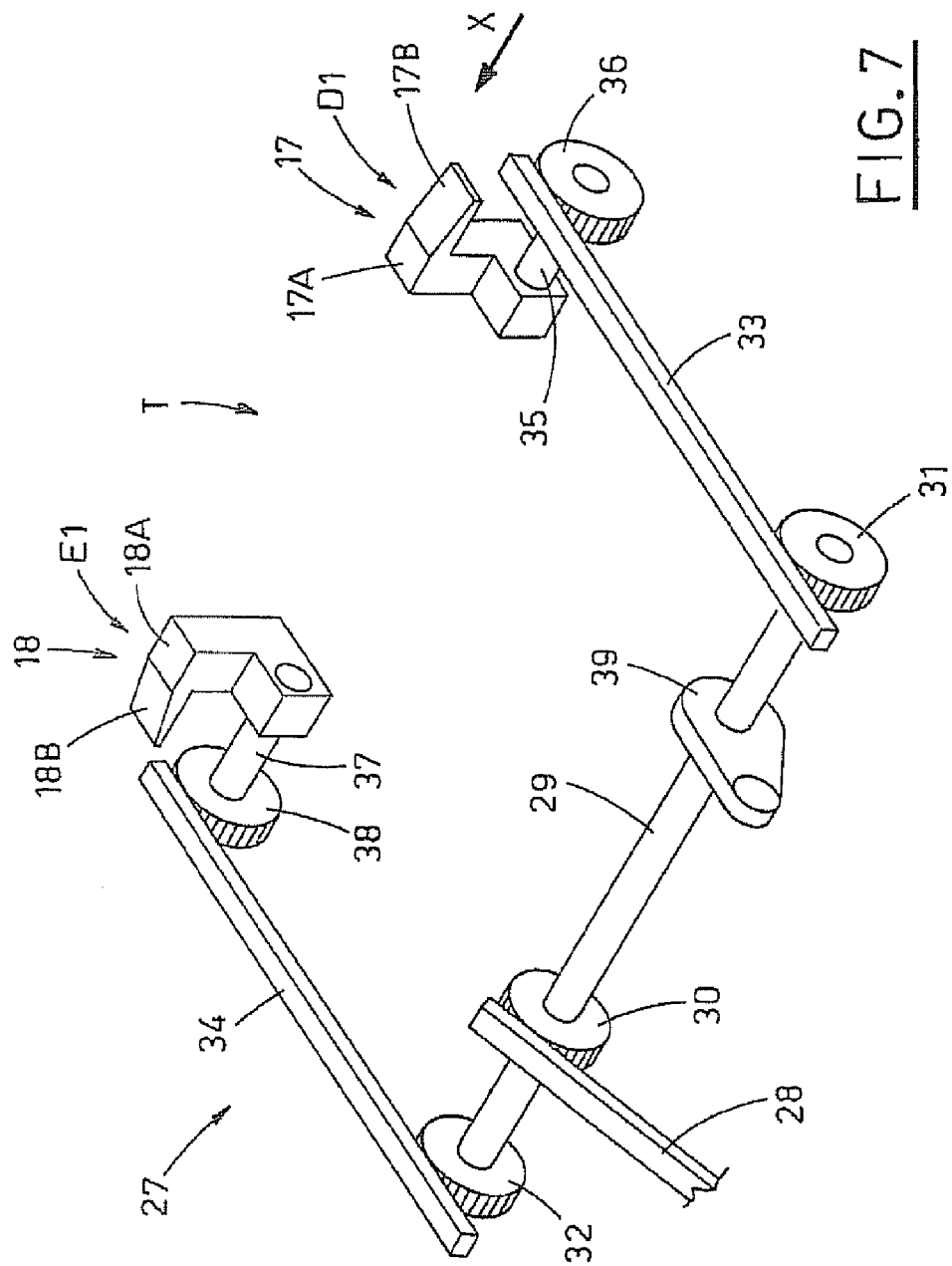

METHOD FOR WEIGHING CONTAINERS WHICH ARE SUPPLIED ALONG A CONVEYING LINE AND A DEVICE FOR ACTUATING THE METHOD

FIELD OF THE INVENTION

The invention relates to a device for weighing containers, such as vials or bottles, which are supplied along a conveying line of a filling system, as well as a method, actuated by the device, for weighing containers. Further, the invention relates to a system for drawing and weighing containers, of which the weighing device and the conveying line are integral parts.

DESCRIPTION OF THE PRIOR ART

The prior art describes weighing devices located at one or more tracts of a conveying line of containers for weighing the containers moved by the conveying line: by way of example, some applications comprise the use of two weighing devices located upstream and downstream of a filling station, respectively in order to weigh containers that are empty and full of product for the purposes of calculating the quantity of product placed in them.

As is known, the weighing mode can include weighing all the containers supplied along the conveying line (100% weighing), or only some batches thereof (statistical weighing).

Weighing devices are known which are designed to enable both above-mentioned weighing modes, in order to guarantee maximum flexibility of use according to application needs. To this end, an example is constituted by patent no. EP1194333, belonging to the same Applicant, which describes a weighing device and a conveying line designed to achieve high productivity specifically for the 100% weighing mode.

The above-cited patent describes an operating unit for supplying containers along a conveying line and in order to transfer the containers from the conveying line to a weighing line. The conveying line comprises: a plurality of displacement modules moved by a conveyor organ and conformed such as to define a series of V-seatings suitable for receiving the containers, by contacting the neck thereof and/or the body; and a sliding track, positioned inferiorly of the displacement modules and fixed to the frame, on which the containers slide when drawn by the displacement modules.

The sliding tract exhibits an interruption at the weighing station. A mobile platform associated to the weighing station is comprised, which engages in the sliding track, such as to restore the continuity thereof; the platform is mobile between: a raised conveying position, in which it is arranged at the level of the sliding track in order to restore the continuity thereof and to restingly receive the containers supplied along the conveyor line; and a lowered weighing position, in which the platform is engaged with weighing means comprised in the weighing station and arranged in proximity of the conveying line, in order to temporarily release the containers collected from the conveying line to rest thereon.

The platform is provided with openings and the weighing means comprise complementary supports at the openings, such that when the platform full of containers is close to reaching the lowered weighing position the supports engage freely in the openings, restingly receiving the containers themselves, in order to enable the weighing to be carried out. For the whole stage of weighing, therefore, the platform must remain in the lowered position; thereafter, the platform follows a return run in order to return the weighed containers on to the conveying line, following the same trajectory as during the outward run.

The platform is moved by a pair of four-bar linkages arranged in the weighing station, symmetrically with respect to a transversal plane to the conveying line; this enables the containers to be moved with a rapid and precise run.

The weighing means are arranged, with respect to the conveying line, in such a way that the containers resting on the relative weighing supports partially engage the conveying line, requiring the halting of the line for the whole weighing stage.

The position of strict vicinity in the weighing means with respect to the conveying line is justified by the need to have the platform making short and rapid runs, with the aim of minimising the times required for the weighing operations.

The above-described unit can be activated in order to perform either a 100% or a statistical weighing, with only the weighing times varying between one weighing mode and the other.

It is known that the accuracy of the weighing is linked to the weighing time; this is due to the inertia effect of the components of the weighing cell, the oscillations induced by possible impacts of the containers with the weighing means etc., which cause an error in measurement which lasts for a "settling period" of the measurer.

A statistical-type weighing mode, being performed only on some container batches, requires a greater measuring accuracy with respect to a 100% type weighing mode, and therefore, according to what is set out herein above, also requires that the containers remain a longer time on the weighing means.

The above-described unit is designed to guarantee a satisfactory productivity in the 100% weighing mode, though with a lower productivity than what can be obtained with the statistical-type weighing mode. The nearness of the weighing means to the conveying line enables the platform to perform a short run during the container transport from and to the line; on the other hand, the fact that the line is occupied by containers undergoing the weighing stage means that it has to be halted. During the statistical weighing, line downtimes suffer as a result of the longer times required for the weighing, and the time required for moving the platform from the lowered position to the raised position.

SUMMARY OF THE INVENTION

The aim of the present invention is to provide a technical solution which enables both a statistical weighing and a 100% weighing to be performed on the containers, ensuring in both weighing modes a satisfactory productivity of the filling system.

A further aim of the present invention is to provide a technical solution which incurs reasonable costs or is in any case balanced by the advantages it is intended to provide.

The above-indicated aims are obtained by means of a device for weighing containers which are supplied along a conveying line in an advancement direction, comprising:

first weighing means arranged on a first side of a stretch of conveying line for containers in a position in which, when receiving at least a container to be weighed, the conveying line is engaged by the container itself;

and a supporting member which is activatable between a first position, in which the supporting member is arranged at the stretch of the conveying line in order to receiving therefrom at least a container, and a second position in which it engages with the first weighing means in order to enable weighing of the at least a container by the first weighing means, the device being characterised in that it further comprises: second weighing means arranged by a side of the stretch of the container conveying line in a position in which, when they receive at least a container to be weight from the supporting member, the conveying line is disengaged from the container, the supporting member further being activatable between the first position and a third position in which it engages with the second weighing means in order to enable the second weighing means to weigh the at least a container;

and first guide means activatable in phase relation with the movement of the supporting member between a guide configuration, in which the first guide means are arranged at the stretch of conveying line in order to guide the containers along the conveying line, and a disengaged configuration in which they are arranged such as to enable the movement of the supporting member which bears at least a container from and to the first position.

The proposed device is preferably destined to perform a weighing operation on 100% of the containers with the first means and a statistical weighing with the second weighing means. The second weighing means can be arranged further from the conveying line with respect to the position of the first weighing means, in a same conveying line.

The weighing of 100% of the containers can be done following the steps described with reference to the above-cited solution. In this sense, the conveying line is halted and the supporting member, stationary in the first position thereof, is activated to take one or more containers received from the line into the second position, where the containers are weighed by the first weighing means; once the containers have been weighed, the supporting member is newly activated to bring the weighed containers onto the conveying line, and the conveying line can then be newly activated.

In the present invention, the statistical weighing can be done in a way which is novel and advantageous with respect to known-type solutions.

A statistical weighing method of the containers supplied along the conveying line, actuated by the weighing device of the invention, can comprise steps of: halting the conveying line; activated the supporting member, stationary in the first position, in order to bring one or more containers received from the conveying line towards the third position; activating the second weighing means in order to weigh the containers received by the supporting member; activating the first guide means, which are stationary in the disengaged configuration, towards the third position in phase relation with the movement of the supporting member, in order to reach the guide configuration; activating the conveying line.

Thus the conveying line remains inactive for a first time interval.

From the above it is evident how the statistical weighing stage can be performed during, and following, the return to normal functioning of the conveying line, i.e. following the activation of the line for moving the containers. The statistical weighing, therefore, can continue during the functioning of the conveying line without specific limitations; this is particularly advantageous, as it enables the weighing times to be freely lengthened, thus improving the accuracy of the measurement (as mentioned the accuracy of the measuring is directly linked to the weighing times). In known-type solutions cited in the preamble hereto, the conveying line has to be kept stationary while the statistical weighing stage is carried out, which requires an often-unacceptable time in consideration of production requirements.

Once the statistical weighing stage has been completed, a container "gap" can be included in the conveying line, i.e. a gap in containers in the line in order to enable reintroduction of the weighed containers. The stages comprised are: halting the conveying line such that at the stretch of conveying line there is a gap in containers; activating the first guide means in order to reach the disengaged configuration; activating the supporting member in phase relation with the movement of the first guide means, activating the support member in order to bring the one or more containers that have already been weighed towards the first position; newly activating the conveying line.

The conveying line is thus inactive for a second time interval.

The sum of the first and second time intervals in which the conveyor remains inactive influences the productivity of the line; the sum is advantageous considerably less than the time required for known-type weighing machines to perform a statistical weighing.

In the light of the above considerations, it is clear how the weighing device of the invention advantageously enables the conveying line to maintain high productivity in both possible weighing modes. In particular, the invention constitutes an obvious improvement with respect to the known-type solutions cited herein above during the relative functioning of the weighing modes of statistical-type weighing.

In the weighing device the first and second weighing means can advantageously be an integral part of a same balance; in this way, the 100% weighing and the statistical weighing are performed by a same measuring instrument, thus both being affected by the same measuring uncertainties.

BRIEF DESCRIPTION OF THE DRAWINGS

Specific embodiments of the invention, and advantageous technical-functional characteristics thereof relating to the specific embodiments and only in part derivable from the above description, are described in the following of the present description, in accordance with what is set out in the claims and with the aid of the accompanying figures of the drawings, in which:

FIG. 1 illustrates a perspective view of a possible applicational solution comprising a conveying line of containers and two weighing devices of the invention cooperating with the conveying line and arranged upstream and downstream of a filling station of product into the containers (filling station not illustrated);

FIG. 2 is a perspective view in enlarged scale of a detail of FIG. 1 taken from a different point of observation, in which some parts have been removed better to illustrate others;

FIG. 3 is a perspective view of the same detail as in FIG. 2, but taken from another point of observation and in which the parts associated to the conveying line have been removed;

FIG. 4 is a schematic view, according to arrow J1 of FIG. 3, which shows a first configuration of the weighing device of the present invention;

FIG. 5 is a detail of FIG. 4, when the weighing device is in a second configuration;

FIG. 6 is a view of detail H of FIG. 4 along arrow J2, in which the weighing device is in the first configuration (denoted by a broken line) and in the second configuration (denoted with a continuous line);

FIG. 7 illustrates a perspective view of the diagram of the activating mechanism of functional elements of the weighing device of the invention which have been illustrated in detail in FIGS. 4-6;

DESCRIPTION OF THE PREFERRED EMBODIMENTS

Figure 8:
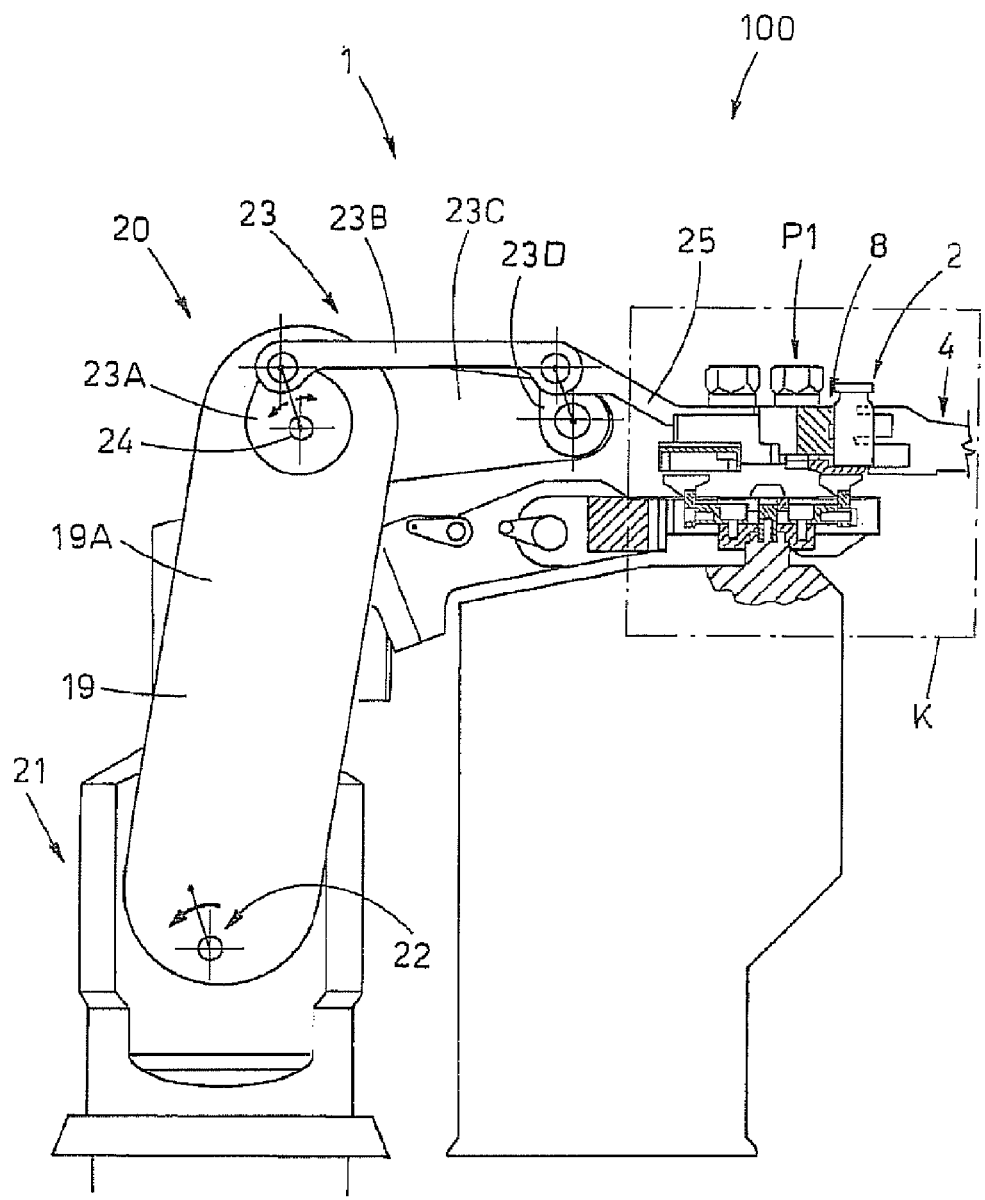
FIG. 8 is a view of a transversal section of the applicational solution of FIG. 1, in which the weighing device illustrated and the conveying line are in a first operating state.

FIG. 1 illustrates a system 100 for drawing and weighing containers 2, comprising a conveying line L of containers 2 and two identical weighing devices, a first 1A and a second 1B, arranged along tracts T1, T2 of the conveying line L at a first side L1 thereof; in particular, the first 1A and the second 1B weighing devices are arranged respectively upstream and downstream of a product filling station of known type (not illustrated), with respect to an advancing direction X of the containers 2 along the line L, for weighing the containers 2 when they are empty (tare measurement) and when they are filled with product (measurement of gross weight).

The conveying line L, in accordance with specific operating requirements, can also be advanced in an advancing direction which is opposite the advancing direction X.

For the sake of simplicity FIG. 1 does not illustrate, since it is not relevant to the invention, a station for inserting empty containers 2 into the conveying line L and a station for removing empty containers 2 from the conveying line L, operating respectively at sections denoted by references A, B.

The conveying line L comprises a ring-wound conveyor organ 3 which moves a plurality of mobile units 4 according to the advancing direction X; the mobile units 4 are arranged at a second side L2 of the conveying line L, opposite the first side L1, and are designed to carry the containers 2. In the illustrated example, each mobile unit 4 bears six containers 2.

Each mobile unit 4 conforms a base 5 for contacting a first bottom portion of the containers 2 (see also FIG. 9) and lateral seatings 6 for partially embracing the body of the container 2, which seatings 6 face the first side L1 of the conveying line L.

The conveying line L further comprises guide lateral sides 7 arranged upstream and downstream of each weighing device 1A, 1B at the first side L1 of the conveying line L such as to be opposite the lateral seatings 6 of the transiting mobile units 4; in the example illustrated in FIG. 1, the lateral sides 7 are three in number.

Upstream and downstream of the weighing devices 1A, 1B, the containers 2 moved by each mobile unit 4 are stably supported by a combined effect exerted by the lateral guides 7 and by the lateral seatings 6 and the base 5 of the mobile unit 4 (FIG. 9); the base 5 contacts each container 2 at a limited surface of the bottom of the container 2 (defined above as the first portion of the bottom of the container 2), which surface is insufficient in itself to support the container 2 stably during the movement thereof along the conveying line L.

At the weighing devices 1A, 1B, a relative supporting member 8 and a guide bar 9 alternatively cooperate, according to the operating configurations of the system 100, with the mobile units 4 for stably supporting the containers 2 either transiting or stationary in the stretches T1, T2 of the conveying line L, as will clearly emerge in the following of the present description.

Herein below explicit reference will be made to only one weighing device, denoted in its entirety by 1 and operating at a stretch T of the line L, and in particular to figures from 2 to 12 in which a preferred embodiment of the invention is illustrated; the remaining figures from 13 to 16 also refer to the same preferred embodiment but in relation to larger containers 2.

The weighing device 1 comprises: first weighing means MP1 arranged on the first side L1 of the tract T of the conveying line L in a position in which, when they receive the containers 2 to be weighed, the conveying line L is engaged by the containers 2 (FIG. 12); second weighing means MP2 arranged by a side of the tract T of the conveying line L in a position in which, when they receive the containers 2 to be weighed, the conveying line L is disengaged from the containers 2 (FIG. 11); a support member 8 (already mentioned herein above) activatable between a first position P1 (FIGS. 2, 3, 8, 9) in which it is arranged at the stretch T of the conveying line L in order to receive the containers 2, a second position P2 (FIG. 12) in which it engages with the first weighing means MP1 in order to enable the containers 2 to be weighed by the first weighing means MP1, and a third position P3 (FIG. 11), in which it engages with the second weighing means MP2 in order to enable the containers 2 to be weighed with the second weighing means MP2; and a guide bar 9 (already mentioned herein above, see FIGS. 1, 3, 9) activatable in phase relation with the movement of the supporting member 8 between a guide configuration C1 (FIG. 11), in which the guide bar 9 is arranged at the stretch T of the conveying line L in order to guide the containers 2 along the conveying line L, and a disengaged configuration C2 (FIG. 10) in which the guide bar 9 is arranged such as to enable movement of the supporting member 8 which brings the containers 2 from and to the first position P1.

Figure 12:
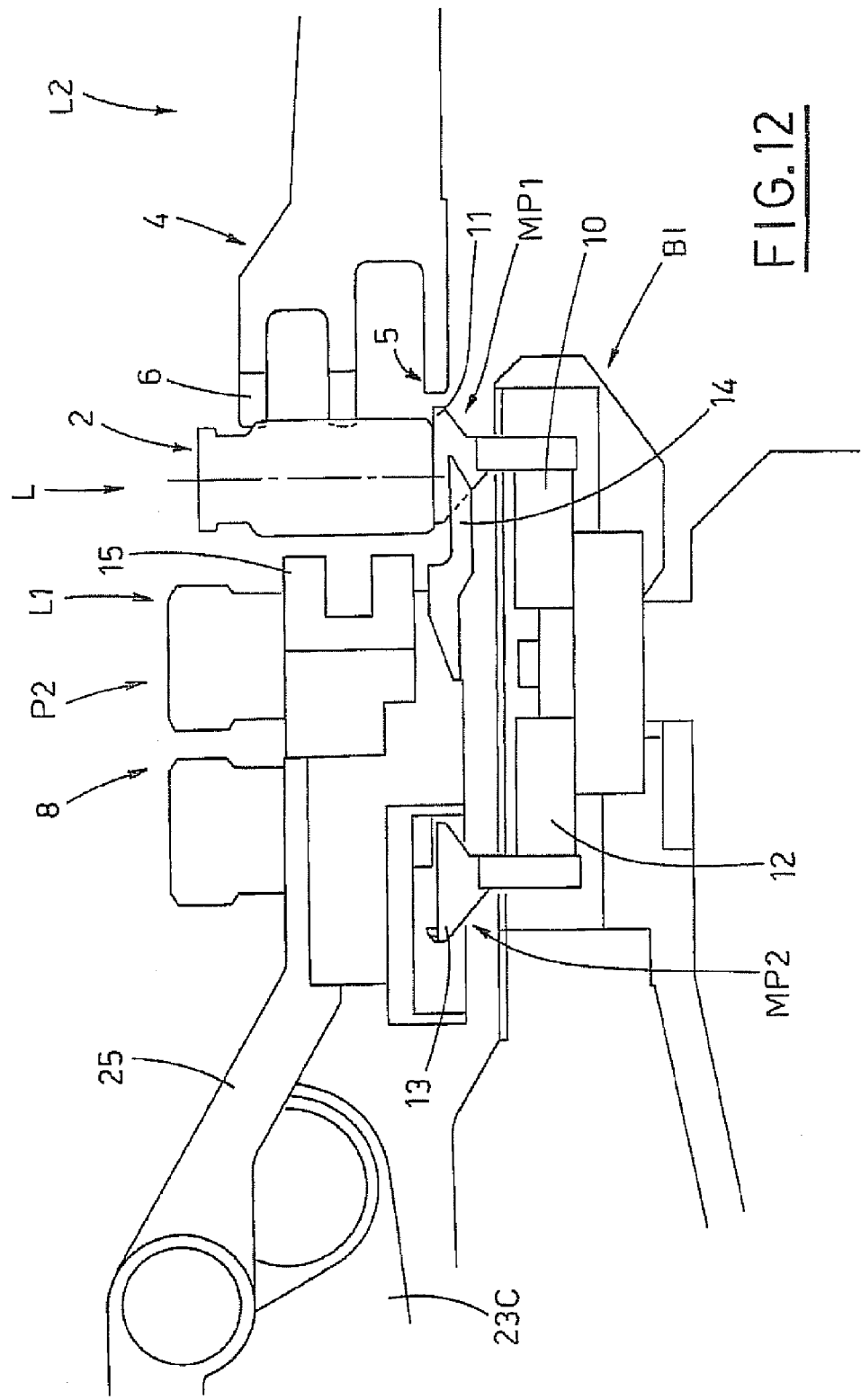
FIG. 12 illustrates the same enlarged detail as in FIG. 9, in which the weighing device and the conveying line are in a fourth operating state.
Figure 13:
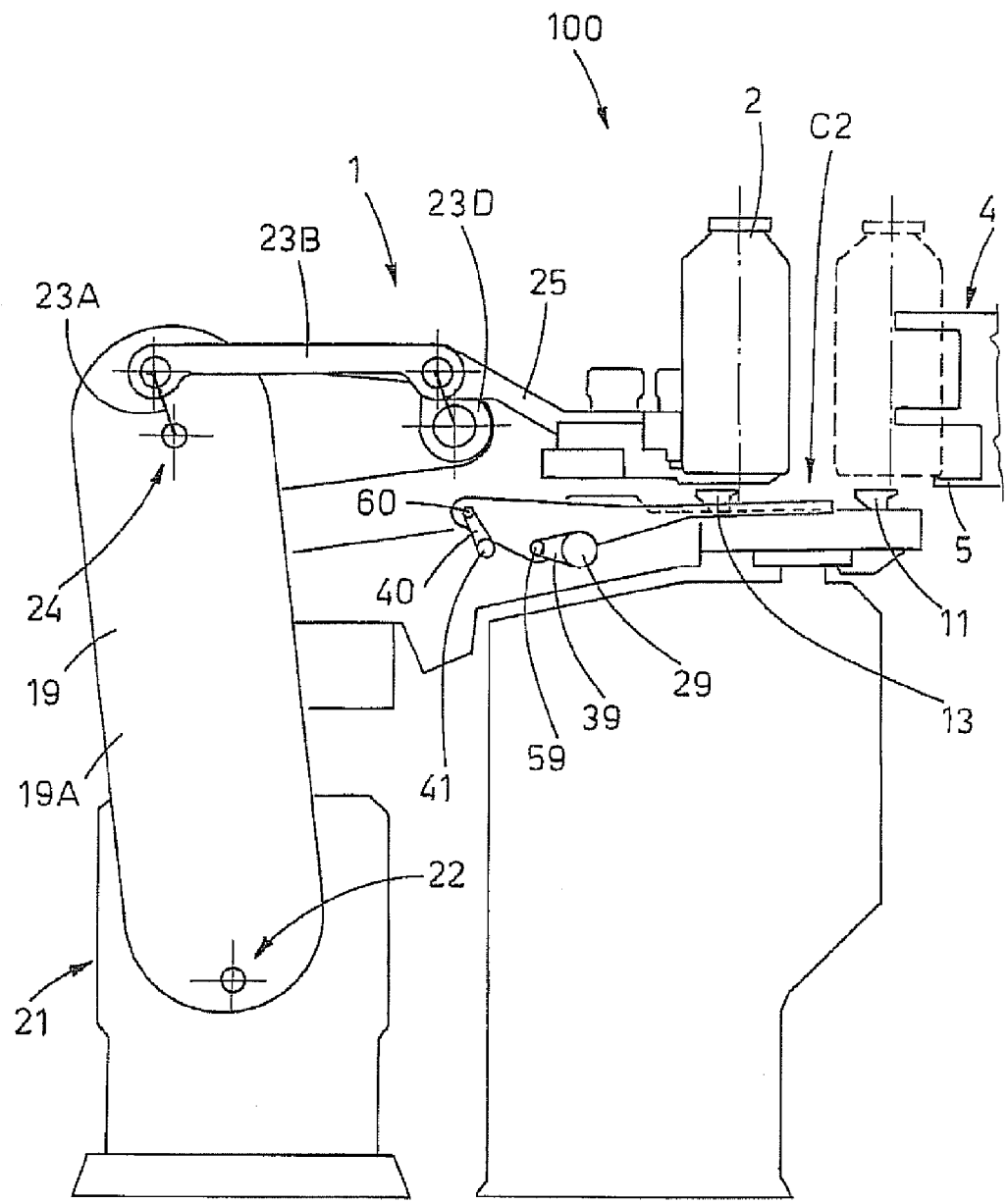
FIG. 13 is a view of a transversal section of the applicational solution of FIG. 1, in which the weighing device and the conveying line are adapted to operate with larger-size containers are in an operating state which is similar to the one illustrated in FIG. 10.

The first weighing means MP1 comprise a first support 10 for restingly receiving the containers 2 to be weighed and a first scale pan 11 connected to the first support 10, while the second weighing means MP2 comprise a second support 12 for restingly receiving the containers 2 to be weighed and a second scale pan 13 connected to the second support 12 (FIG. 12).

Figure 10:
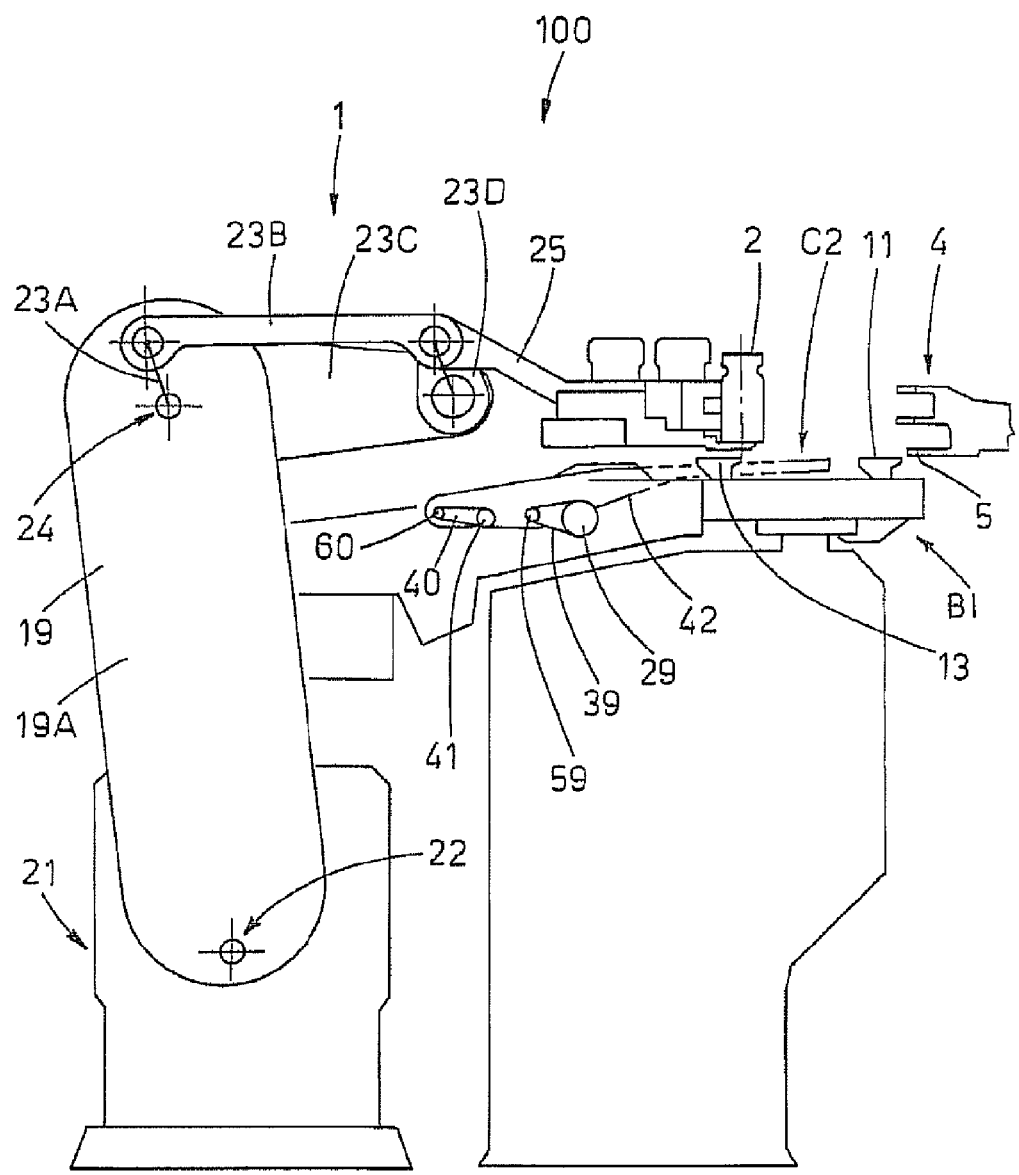
FIGS. 10, 11 are each a same view as FIG. 8 in which the weighing device and the conveying line are respectively in a second and third operating state.
Figure 11:
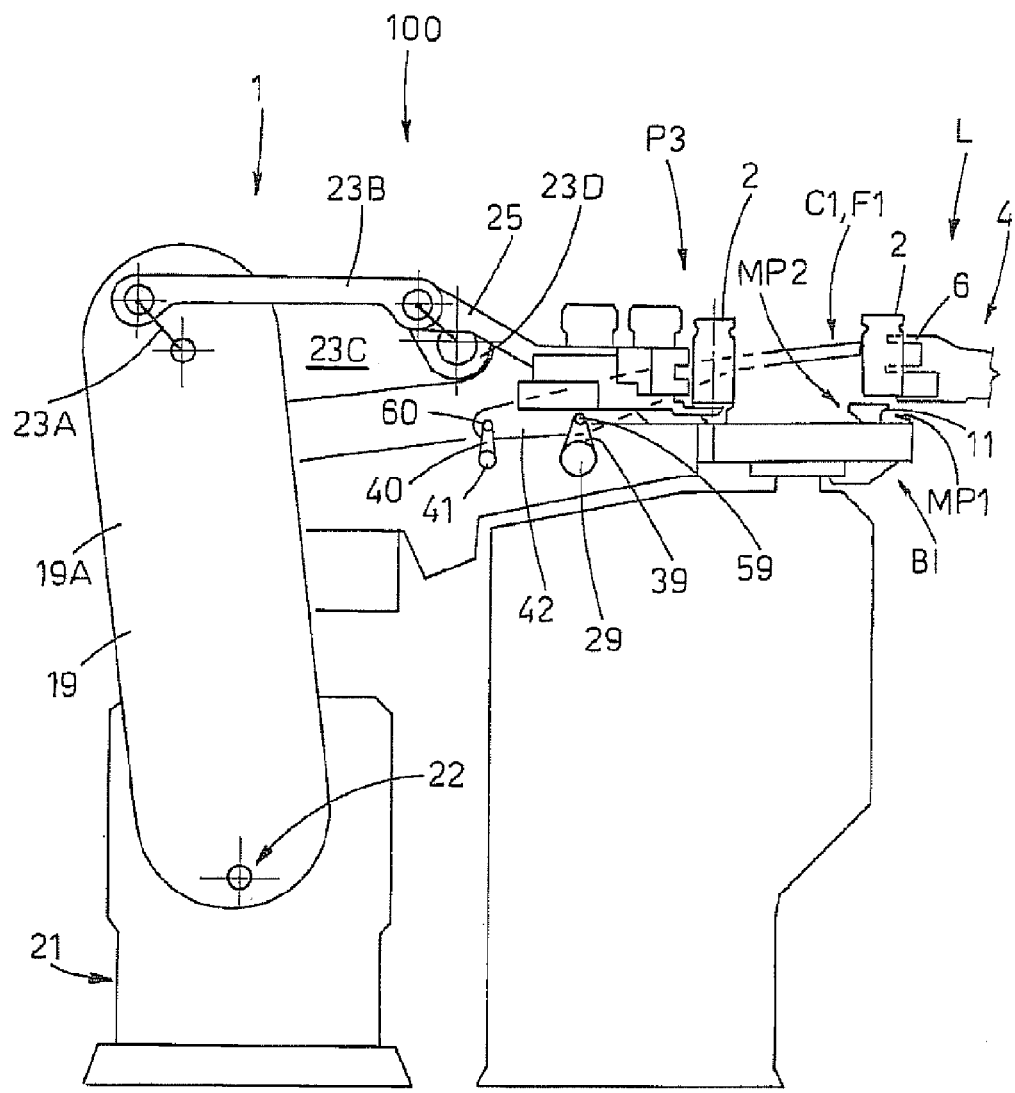

The first and second weighing means MP1, MP2 are an integral part of a single balance generically denoted by BI; the balance BI is arranged transversally to the conveying line L, such that the second support 12 is further from the conveying line L than the first support 10 (FIGS. 10-12). In particular, as has been specified above, the position of the second support 12 is such that when it restingly receives the containers 2, they do not occupy the conveying line L (FIG. 11).

The first and second supports 10, 12 exhibit projections 16, only partially visible in FIG. 2.

The support member 8 comprises a rest base 14 and lateral guide means 15. The rest base 14 is provided with a plurality of through-holes 150 (FIGS. 2, 3), conformed to freely engage with the projections 16 of the first and second support 10, 12 when the supporting member 8 respectively reaches the second P2 and the third P3 positions, such that the projections 16 pass through the through-holes 150 of the rest base 14. In this way the containers 2 borne by the supporting member 8 can be received on the first support 10 and the second support 12 respectively when the support member reaches the second position P2 and the third position P3.

The support member 8, once the containers 2 have been rested on the supports 10 and 12, performs a brief tract of overrun such as to distance by a few millimeters from the containers 2 being weighed, and such as not to influence the weighing in any way.

In other words, in the second position P2 and in the third position P3, the support member 8 does not contact the containers 2.

The lateral guide 15 is perpendicular to the rest base 14 and performs a similar function to the lateral guides 7 of the conveying line L.

Figure 9:
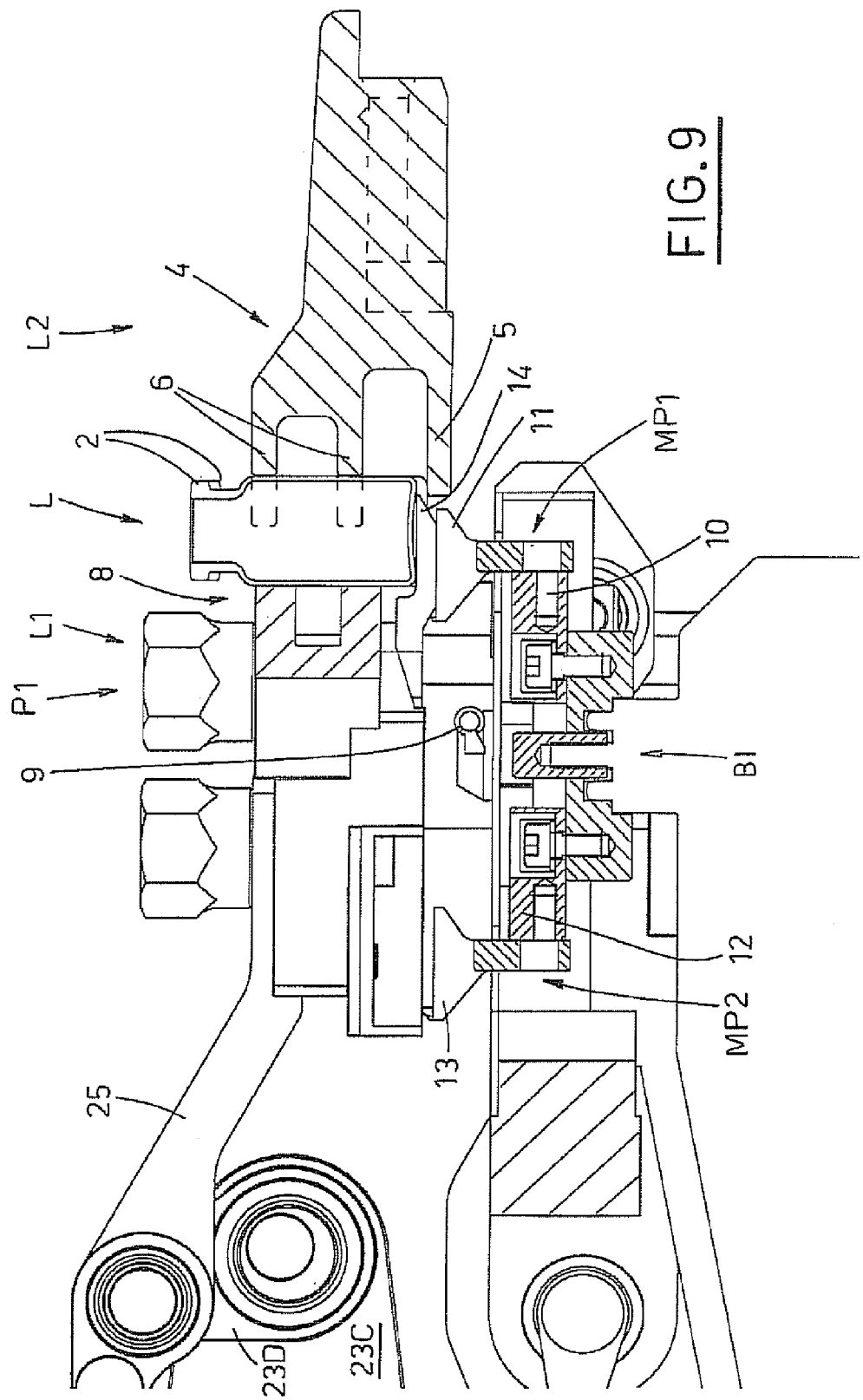
FIG. 9 illustrates the enlarged detail K of FIG. 8.

When the supporting member 8 is in the first position P1, it is arranged such that the upper contact surface of the rest base 14 is at a greater height than the upper contact surface of the base 5 of a corresponding mobile unit 4 arranged at the stretch (FIG. 9). This means that the mobile unit 4 opposite to the support member 8 in the first position P1 embraces the containers 2 by means of the lateral seatings 6 but does not contact the containers 2 with the base 5 (in FIG. 9 two other containers 2 are visible behind, which do contact the base 5 with their bottoms; the base 5 belongs to a following mobile unit 4 arranged downstream of the stretch T, and the containers 2 the base 5 contacts are borne by the following mobile unit 4).

The containers 2 in the stretch T of the conveying line L when the support member 8 is arranged in the first position P1 are supported stably by the combined effect exerted by the lateral guide 15 and the rest base 14 of the support member 8 and the lateral seatings 6 of the corresponding mobile unit 4 transiting or stationary at the stretch T of the conveying line L. When the guide bar 9 is in the guide configuration C1 (FIG. 11), the containers 2 advancing in the stretch T of the conveying line L are stably supported by the combined effect exerted by the guide bar 9 and the lateral seatings 6 and by the base 5 of the mobile unit transiting through the stretch T (FIG. 11).

The supporting member 8 is activated by movement means denoted in their entirety by number 20, which comprising (FIGS. 8, 10, 11); a first mobile arm 19 hinged to a first end of base 21 of the weighing device 1 at a first hinge axis 22; a four-bar linkage 23, made up of a first member 23A (functionally represented with a segment thereof), by a second member 23B, a third member 23C and a fourth member 23D (also functionally represented with a segment thereof), hinged to a second end of the first mobile arm 19, opposite the first end thereof, at a second hinge axis 24; and a connecting member 25 for bearing the support member 8, which connecting member 25 thereof is connected to the supporting member 8, on one side, and is fixed to the fourth member 23D of the four-bar linkage 23 which is distal to the first mobile arm 19 on the other side.

In the operating configurations in which the supporting member 8 is moved between the first position P1 and the second position P2 and between the first position P1 and the third position P3, the first mobile arm 19 and a member of the four-bar linkage 23, for example the first member 23A, are activated in order to ensure that the rest base 14 of the support member 8 is maintained substantially horizontal in order to ensure a stable and secure transfer of the containers 2 resting on the base 14. More specifically, the movement of the support member 8 between the first position P1 and the second position P2 requires only the activating of the four-bar linkage 23; the first arm 19 stays stationary. Instead, the movement of the support member 8 between the first position P1 and the third position P3 requires that the first arm 19 and the four-bar linkage 23 be activated in an appropriate phase relationship with one another.

The perspective FIGS. 2, 3 show in greater detail the spatial arrangement of the movement means 20 according to the present embodiment. As can be noted from FIGS. 2, 3, the four-bar linkage 23 develops across the first mobile arm 19; the first member 23A of the four-bar linkage 23 is engaged at a first surface 19A of the first mobile arm 19, while the third member 23C of the four-bar linkage 23 engages at a second surface 19B, opposite the first surface 19A, of the first mobile arm 19. An appendage 26, solidly constrained to the fourth member 23D of the four-bar linkage 23, enables functional connection with the third member 23C of the four-bar linkage 23; in other words the appendage 26 enables the rotating coupling of the fourth member 23D of the four-bar linkage 23 with the third member 23C of the four-bar linkage 23.

The weighing device 1 comprises first directing means 17 acting upstream of the stretch T of the conveying line L with respect to the advancing direction X of the containers 2, for directing the containers 2 in advancement along the line L on the supporting member 8 when the supporting member 8 is in the first position P1; the first directing means 17 are a first directing member activatable between a directing position D1 (see FIGS. 4, 7) and a disengaged position D2 (FIG. 5) in which it does not intervene on the containers 2 in transit along the line L. In particular, the first directing member 17 exhibits a flat surface 17A and an inclined surface 17B contiguous thereto; the first directing member 17 is arranged such that when it is in the directing position D1 the inclined surface 17B is inclined upwards with respect to the advancing of the containers 2 and the flat surface 17A is substantially at the level of the rest base 14 of the supporting member (FIG. 7), with the result that the inclined surface 17B is destined to encounter the bottom of the container 2 advancing towards the stretch T of the conveying line L, modifying its trajectory. Thus deviated, as they advance, moved by the corresponding mobile unit 4, the containers 2 drag in order on the inclined surface 17B, on the flat surface 17A and thereafter are transferred onto the rest base 14 of the supporting member 8 (FIG. 4).

Likewise, the weighing device 1 comprises second directing means 18 acting downstream of the stretch T of the conveying line L with respect to the advancing direction X of the containers 2, to newly direct the containers 2 that have been weighed onto the line L, advancing slidingly on the supporting member 8 when the supporting member 8 is in the first position P1; the second directing means 18 are a second directing member activatable between a directing position EI (see FIGS. 3, 4, 7 and 6 in which the second directing member 18 is shown in a broken line) and a disengaged position E2 (see FIG. 6), in which the second directing member 18 is indicated by a continuous line) in which it does not intervene on the containers 2 transiting on the line L. In particular, the second directing member 18 exhibits a flat surface 18A and an inclined surface 18B contiguous thereto; the second directing member 18 is arranged such that, when in the directing position E1, the inclined surface 18B is inclined downwards with respect to the advancing of the containers 2 and the flat surface 18A is substantially at the level of the rest base 14 of the supporting member 8, with the result that the containers 2, as they advance, moved by the corresponding mobile unit 4, drag in order on the supporting member 8, on the flat surface 18A, on the inclined surface 18B and finally on the base 5 of the mobile unit 4, on which they are destined to remain in contact (FIG. 4).

The first and the second directing means 17, 18 are moved via a control mechanism 27, comprising: a first activating bar 28; a first driven shaft 29 on which a first cogged wheel 30 is mounted, which engages with the first activating bar 28 in order to receive drive therefrom; a second cogged wheel 31 and a third cogged wheel 32 mounted on the first driven shaft 29; a second bar 33 and a third bar 34 positioned respectively in order to engage with the second cogged wheel 31 and with the third cogged wheel 32; a second shaft 35 on which a fourth cogged wheel 36 is mounted, which engages with the second bar 33, the second shaft 35 engaging with the first directing means 17; a third shaft 37 on which a fifth cogged wheel 38 is mounted, which engages with the third bar 34, the third shaft 37 engaging with the second directing means 18.

It is possible, via the third activating bar 28, to contemporaneously activate the first and the second directing means 17, 18, respectively between the directing position D1, EI (FIGS. 4, 7) and the disengaged position D2, E2 (FIGS. 5 and 6 respectively).

A part of the control mechanism 27 is used to activate the guide bar 9, and is constituted by the first activating bar 28, the first cogged wheel 30 and the first driven shaft 29. The control mechanism used for activating the guide bar 9 further comprises: a first element 39 mounted on the first driven shaft 29 in order to receive drive therefrom (see FIG. 7); a second element 40 mounted on a fourth idle shaft 41 which is borne by the base 21 of the weighing device (FIGS. 10, 11); and a second arm 42 to an end of which the guide bar 9 is perpendicularly connected, and to an opposite end of which the first element 39 and the second element 40 are hinged.

A change of format of the containers 2 supplied along the conveying line L requires only the substituting of the second arm 42; the new second arm 42 must exhibit hinge axes 59, 60 which respectively have the first element 39 and the second element 40 distanced from one another such that the guide bar 9 assumes, in the guide configuration CI, a suitable position for guiding the containers 2 of the specific format transiting in the stretch T of the conveying line L. In other words, a different interaxis must be provided between the hinge axes 59, 60 according to the format change of the containers 2, and this can be obtained by providing a second arm 42 which exhibits time by time a suitable conformation; by comparing FIGS. 11 and 14 it can be seen that the second arm 42 provided in the two cases has hinge axes 59, 60 with the first element 39 and the second element 40 exhibiting different reciprocal distances.

In FIG. 11 the position assumed by the guide bar 9 in the guide configuration CI has been denoted by reference F1.

Figure 14:
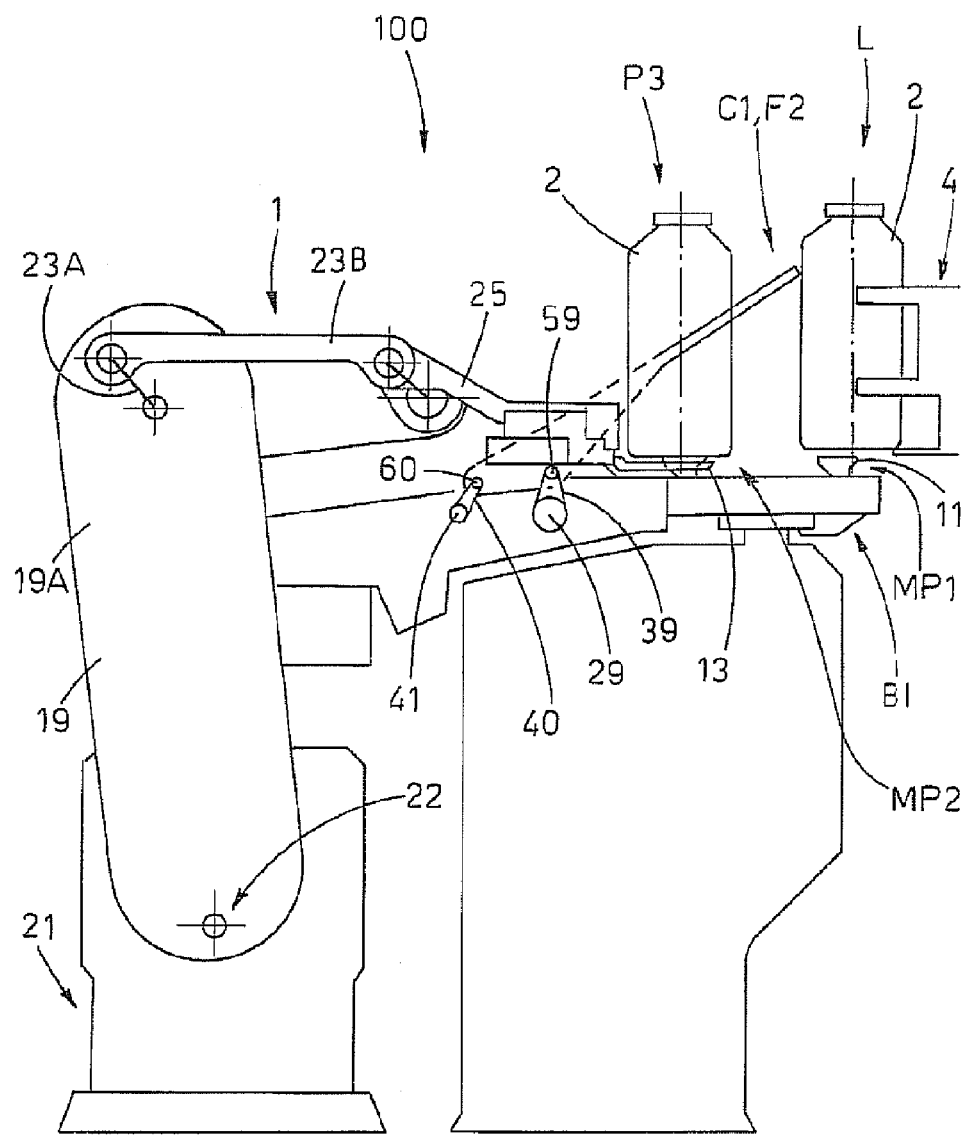
FIG. 14 bears the same relation to FIG. 11.
Figure 15:
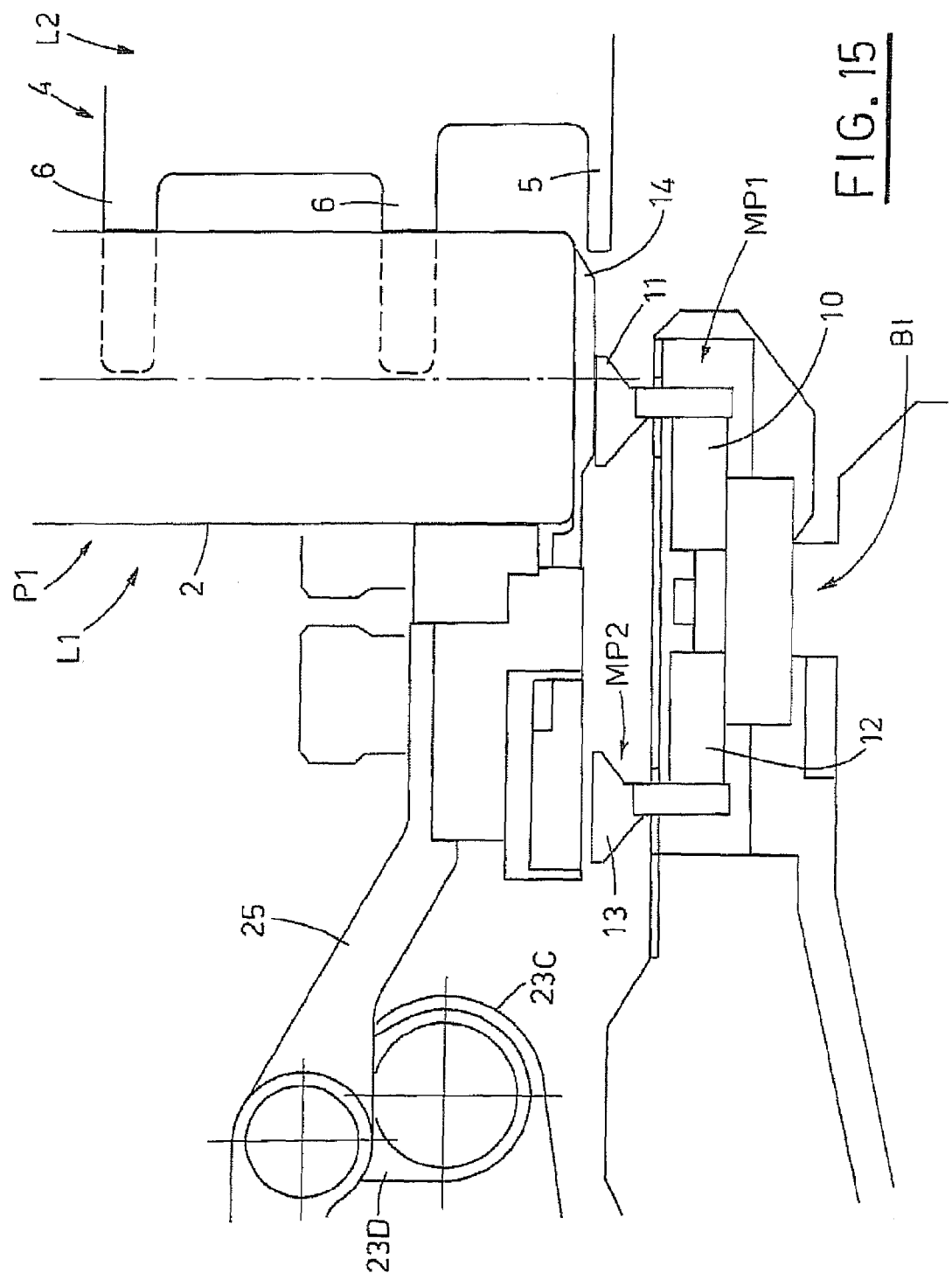
FIG. 15 bears the same relation to FIG. 9.
Figure 16:
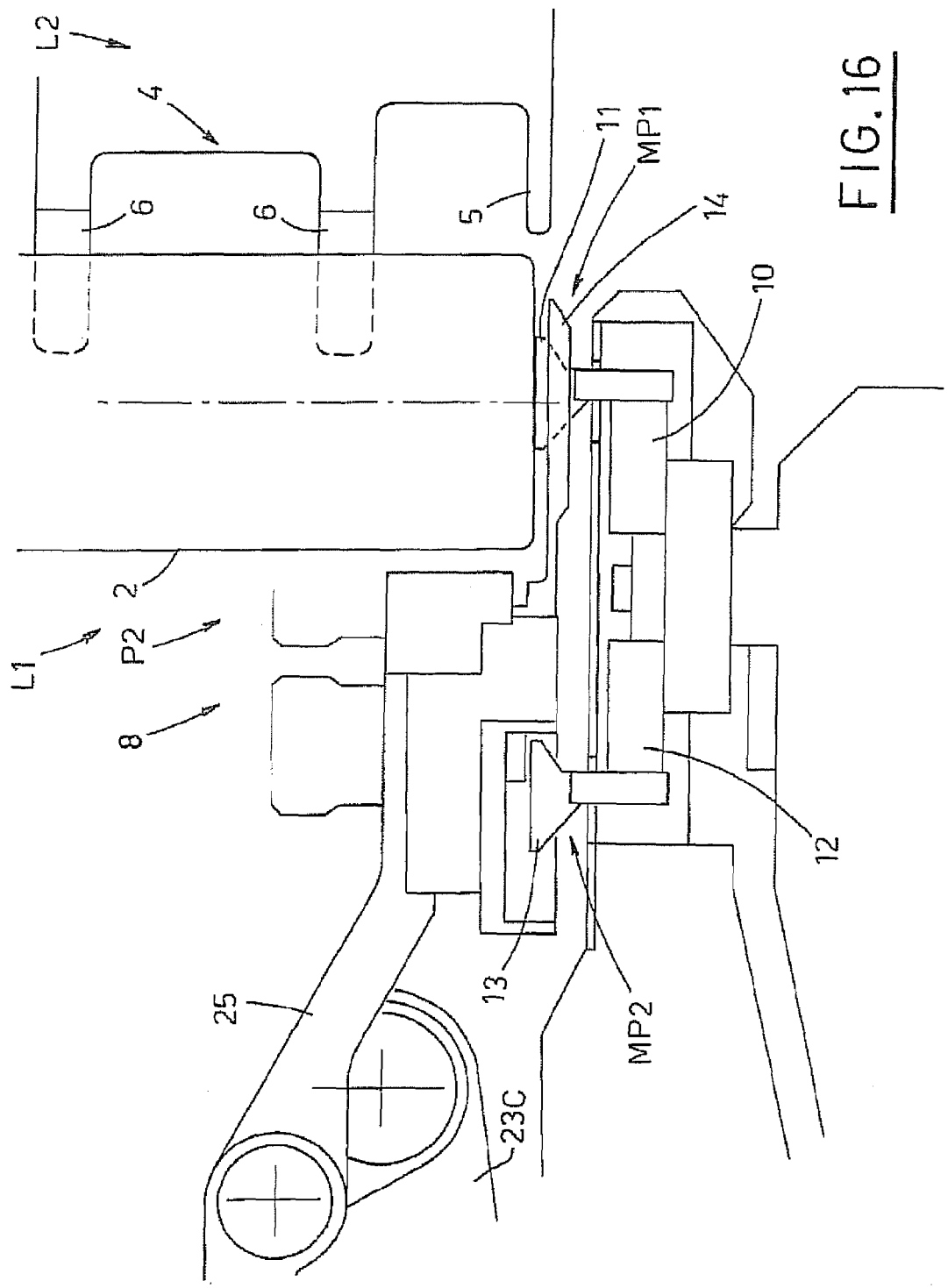
FIG. 16 bears the same relation to FIG. 12.

Containers 2 of larger format, i.e. greater height and width than those illustrated in FIGS. 13-16, require that the guide bar 9 reaches a more retreated and higher position with respect to the position denoted as FI in FIG. 11. An example is shown in FIG. 14, where a second arm 42 is installed which is configured such that the relative hinge axes 59, 60 with the first element 39 and the second element 40 exhibit a reciprocal distance which is different to the reciprocal distance between the hinge axes 59, 60 of the second arm illustrated in FIG. 11; the new position assumed by the guide member 9 for larger-format containers 2 has been denoted by reference F2 in FIG. 14.

The phase-related activation through the first control bar 28 the first directing means 17 and the second directing means 18, and the guide bar 9, is advantageous, as will clearly emerge from the following description of the functioning of the system 100 for drawing and weighing the containers 2.

In the 100% weighing mode, all the containers 2 transiting on the conveying line L are weighed by the first weighing means MPI; in this case the conveying line L functions intermittently.

The first and second directing means 17, 18 stay in the directing position D1, EI (FIGS. 4, 7); likewise the guide bar 9 remains in the disengaged position C2. The first activating bar 28 is therefore not activated.

With reference to the 100% weighing mode, and starting from the operating state of the system 100 illustrated in FIGS. 8, 9, each functioning cycle of the system 100 comprises steps of:

halting the conveying line L (FIG. 9) such that a mobile unit 4 faces the supporting member 8 stationary in the first position P1;

moving the supporting member 8 from the first position P1 into the second position P2 (via the rotation of the first member 23A) (FIG. 12);

activating the first weighing means MP1 to weigh the containers 2;

moving the supporting member 8 from the second position P2 to the first position P1 (FIG. 9);

newly activating the conveying line L.

The supporting member 8 performs a translation with a horizontal and vertical component, performing identical trajectories in the outward run (from the first position P1 to the second position P2) and in the return run (from the second position P2 to the first position P1) in which the rest base 14 is kept horizontal; in particular the supporting member 8, in order to move from the first position P1 to the second position P2, is lowered and distances from the conveying line L. The movement of the supporting member 8 from the first position P1 to the second position P2, and vice versa, can be obtained by rotating the first member 23A of the four-bar linkage 23 respectively in an anti-clockwise direction and in a clockwise direction about the second hinge axis 24.

The containers 2 borne by each mobile unit 4 follow a trajectory of the type represented in FIG. 4; upstream of the stretch T of the conveying line L the containers 2 contact, with a relative bottom portion thereof, the base 5 of the mobile unit 4; in proximity of the stretch T of the conveying line, the containers 2 encounter the first directing means 17 and are deviated and channelled onto the supporting member 8 which they contact via a second portion of the relative bottom; the containers 2, pushed by a respective mobile unit 4, drag on the supporting member 8 as long as the conveying line L is halted, for the removal of the containers 2; once the supporting member 8 returns the containers 2 weighed on the conveying line L, the respective mobile unit 4 is newly activated; the containers 2 therefore drag on the supporting member 8, through the second directing means 18, up until they exit from the stretch T; then the containers 2 newly return to contact, with the first bottom portion thereof, the base 5 of the mobile unit 4 and proceed in their trajectory along the conveying line L, according to the advancing direction X.

The statistical weighing mode also comprises an intermittent functioning of the conveying line L, but with halt modes of the line that are different from those for the 100% weighing mode: in order to perform a statistical weighing of containers 2 borne by a mobile unit 4, the conveying line L must be halted in two distinct time intervals in order to enable removal of the containers 2 to be weighed and to thereafter to reintroduce the weighed containers 2 newly onto the conveying line L. Therefore two steps can be distinguished.

Starting from the operating state of the system 100 illustrated in FIGS. 8, 9, in a first step the system 100 comprises:

halting the conveying line L (FIG. 9);

moving the supporting member 8 from the first position P1 towards the third position P3 (by rotation of the first mobile arm 19 before and the second member 23A after) (FIG. 10);

activating the second weighing means MP2 in order to weigh the containers 2 received from the supporting member 8;

in phase relation with the movement of the supporting member 8 towards the third position P3, moving the guide bar 9 into the guide configuration C1 and the first and second directing means 17, 18 into the disengaged position D2, E2 (FIG. 11);

newly activating the conveying line L.

The conveying line L is newly activated during the stage of statistical weighing, which can last for the time necessary for obtaining an accurate weight measurement of the containers 2.

During the stage of statistical weighing the conveying line L can be activated either continuously or intermittently.

The containers 2 transiting in the stretch T of the conveying line L are stably supported by the combined effect exerted by the lateral seatings 6 and the base 5 of the corresponding mobile unit 4 and by the guide member 9 which performs the same function as the lateral guides 7 arranged upstream and downstream of the weighing device 1A, 1B, as specified herein above.

Starting from the operating state of the system 100 illustrated in FIG. 11, in the second stage the system 100 comprises:

leaving a mobile unit 4 in transit along the conveying line L without containers 2;

halting the conveying line L such that the mobile unit 4 without containers 2 faces the stretch T of the conveying line L;

moving the guide bar 9 from the guide configuration CI to the disengaged configuration C2 and the first and second directing means 17, 18 from the disengaged position D2, E2 to to the directing position D1, E2;

in phase relation with the movement of the guide bar 9 towards the disengaged configuration C2, moving the supporting member 8 from the third position P3 towards the first position P1 (through the rotation of the first member 23A first and the mobile arm 19 after) in order to receive the weighed containers 2 from the second weighing means MP2 and carry them onto the conveying line L;

newly activating the conveying line L.

As has been specified, the first directing means 17, the second directing means 18 and the guide member 9 are activated contemporaneously via the first activating bar 28. In more detail, the first activating bar 28 is activatable between two states: in a first state the first directing means 17 and the second directing means 18 are respectively in a directing position D1, EI, while the guide bar 9 is in the disengaged configuration C2; in a second state the first directing means 17 and the second directing means 18 are respectively in a disengaged position D2, E2 while the guide bar 9 is in the guide configuration C1. The movement of the first activating bar 28 between the two states advantageously enables contemporaneously activating the first directing means 17, the second directing means 18 and the guide bar 9 during the statistical weighing modes.

FIGS. 13-16 illustrate the functioning of the drawing and weighing system in the case of use of containers 2 having a larger format with respect to those illustrated in FIGS. 2-12. It is obvious how the system 100 can be adapted simply and rapidly to each format change of the containers 2, as has been explained herein above. It is sufficient to re-designate the mobile units 4, the lateral guides 7, the lateral guide 15 of the supporting member 8 and the second arm 42 to the new format in use. It is understood that the above has been described by way of non-limiting example, and that any eventual constructional variants fall within the ambit of protection of the present technical solution, as described herein above and in the appended claims.

The invention claimed is:

1. Weighing apparatus for weighing containers (2) fed along a conveying line (L) in an advancing direction (X), comprising:

first weighing means (MP1) arranged on a first side (L1) of a stretch (T) of a conveying line (L) adapted for conveying containers (2); and a supporting member (8) operable between a first position (P1), wherein the supporting member (8) is arranged at said stretch (T) of the conveying line (L) for receiving from the latter at least one container (2), and a second position (P2) wherein the supporting member (8) engages the first weighing means (MP1) for allowing said at least one container (2) to be weighed by means of said first weighing means (MP1), the apparatus being characterised in that it further comprises:

second weighing means (MP2) arranged on said first side (L1) of said stretch (T) of the conveying line (L) in a position in which, when said second weighing means (MP2) receive at least one container (2) to be weighed from the supporting member (8), the conveying line (L) is disengaged from the container (2), said supporting member (8) being further operable between said first position (P1) and a third position (P3) wherein the supporting member (8) engages the second weighing means (MP2) for allowing said at least one container (2) to be weighed by means of said second weighing means (MP2).

2. Apparatus according to claim 1, further comprising first guide means (9) operable in phase relation with the supporting member (8) between a guide configuration (C1), wherein the said first guide means (9) are arranged at said stretch (T) of said conveying line (L) for guiding the containers (2) along the conveying line (L), and a disengaged position (C2) wherein said first guide means (9) are arranged in such a way as to allow the supporting member (8) bearing at least one container (2) to move from and to the first position (P1).

3. Apparatus according to claim 2, wherein the supporting member (8) includes a second guide means (15) arranged for guiding the containers (2) along the conveying line (L) when the supporting member (8) is in the first position (P1).

4. Apparatus according to claim 2, wherein the first guide means (9) include a guide member extending longitudinally, said first guide means being operable in phase relation with the supporting member (8).

5. Apparatus according to claim 1, wherein said first weighing means (MP1) comprise a first support (10) for supportingly receiving at least one container (2) to be weighed and a first scale pan (11) connected to the first support (10), and wherein the second weighing means (MP2) include a second support (12) for supportingly receiving at least one container (2) to be weighed and a second scale pan (13) connected to the second support (12).

6. Apparatus according to claim 5, wherein the first weighing means (MP1) and the second weighing means (MP2) are integral parts of a same scale (BI).

7. Apparatus according to claim 1, wherein the supporting member (8) includes a rest base (14) provided with openings (150), and a first support (10) of the first weighing means (MP1) and a second support (12) of the second weighing means (MP2) are provided with projecting parts (16), the rest base (14) of the supporting member (8) and the first support (10) and second support (12) being dimensioned so that the openings (150) of the rest base (14) freely engage the projecting parts (16) of the first support (10) and of the second support (12) when the supporting member (8) reaches the second position (P2) and the third position (P3), respectively.

8. Apparatus according to claim 1, further comprising first directing means (17) arranged upstream of said stretch (T) of the conveying line (L) and movable between a directing position (D1), wherein the first directing means (17) direct the containers (2) advancing on the conveying line (L) on the supporting member (8) when the latter is in the first position (P1), and a disengaging position (D2).

9. Apparatus according to claim 8, further comprising second directing means (18) arranged downstream of said stretch (T) of the conveying line (L), movable between a directing position (EI), wherein the second directing means (18) direct again on the conveying line (L) the containers (2) slidingly advancing on the supporting member (8) arranged on the first position (P1), and a disengaging position (E2).

10. Apparatus according to claim 9, wherein the first directing means (17) include an inclined surface (17B) which abuts and diverts the containers (2) upwards when the first directing means (17) are in the directing position (D1), and the second directing means (18) include an inclined surface (18B) which contacts and diverts the containers (2) downwards when the second directing means (18) are in the directing position (EI).

11. Apparatus according to claim 9, further comprising a control mechanism (27) for controlling the first directing means (17) and the second directing means (18), said control mechanism being adapted to move the directing means (17) and the second directing means (18) in phase relation with said guide means (9).

12. Apparatus according to claim 1, further comprising means (20) for moving the supporting member (8), said means comprising: a first mobile arm (19) that is connected to a base (11) and a 4-bar linkage (23) supporting the supporting member (8), the 4-bar linkage (23) being in turn supported by the first mobile arm (19), said first mobile arm (19) and 4-bar linkage (23) being controlled in mutual phase relation so as to maintain the rest base (14) of the supporting member (8) substantially horizontal when the supporting member (8) moves from the first position (P1) and the second position (P2) and between the first position (P1) and the third position (P3).

13. System for driving and weighing containers including the apparatus for weighing containers (2) according to claim 1 and a conveying line (L) for conveying containers (2), said conveying line (L) comprising: guide lateral sides (7) arranged upstream and downstream of the stretch (T) of the conveying line (L) at the relative first side (L1); and a plurality of mobile units (4) acting at a second side (L2) of the conveying line (L), said second side (L1) being opposite to said first side (L1), in order to cooperate with the guide lateral sides (7) and the first guide means (9) or the supporting member (8) in order to move the containers (2) along the advancing direction (X).

14. System according to claim 13, wherein each mobile unit (4) includes a base (5) with a contact surface for contacting a first portion of the bottom of one or more containers (2) and the supporting member (8) includes a rest base (14) with an upper rest surface for supportingly receiving a second portion of the bottom of one or more containers (2), the upper rest surface of the rest base (14) of the supporting member (8) being arranged, when the supporting member (8) is in the first position (P1), at a height higher than the contact surface of the base (5) of the mobile unit (4).

15. Method for weighing containers (2) fed along a conveying line (L), said method being operable by the apparatus according to claim 1 when the conveying line (L) is stopped, the method including the steps of:
    operating the supporting member (8) for bringing one or more containers (2) received from the conveying line (L) to the third position (P3);
    activating the second weighing means (MP2) for weighing the containers (2) received from the supporting member (8);
    operating, in phase relation with the supporting member (8) moving towards the third position (P3), the first guide means (9) for reaching the guide configuration (C1).

* * * * *